United States Patent
Mejia et al.

(10) Patent No.: US 12,511,870 B2
(45) Date of Patent: Dec. 30, 2025

(54) INFERRING TONE CONVEYED BY DIGITAL CONTENT

(71) Applicant: Adobe Inc., San Jose, CA (US)

(72) Inventors: Irgelkha Mejia, River Edge, NJ (US); Michele Saad, Austin, TX (US); Ajay Jain, San Jose, CA (US)

(73) Assignee: Adobe Inc., San Jose, CA (US)

( * ) Notice: Subject to any disclaimer, the term of this patent is extended or adjusted under 35 U.S.C. 154(b) by 266 days.

(21) Appl. No.: 18/527,777

(22) Filed: Dec. 4, 2023

(65) Prior Publication Data

US 2025/0182445 A1 Jun. 5, 2025

(51) Int. Cl.
*G06V 10/74* (2022.01)
*G06V 10/764* (2022.01)
*G06V 10/82* (2022.01)
*G06T 3/00* (2006.01)

(52) U.S. Cl.
CPC .......... *G06V 10/761* (2022.01); *G06V 10/764* (2022.01); *G06V 10/82* (2022.01); *G06T 3/00* (2013.01)

(58) Field of Classification Search
None
See application file for complete search history.

(56) References Cited

U.S. PATENT DOCUMENTS

| | | | |
|---|---|---|---|
| 12,283,084 B2* | 4/2025 | Saraee | G06V 10/761 |
| 2020/0081548 A1* | 3/2020 | Sirpal | H04N 21/8133 |
| 2020/0210764 A1* | 7/2020 | Hamedi | G06F 18/214 |
| 2020/0410292 A1* | 12/2020 | Trim | G06N 3/0464 |
| 2021/0297498 A1* | 9/2021 | Divakaran | G06N 3/094 |

* cited by examiner

*Primary Examiner* — Haris Sabah
(74) *Attorney, Agent, or Firm* — FIG. 1 Patents

(57) ABSTRACT

In accordance with the described techniques, a tone embedding system includes one or more generative content models and a neural network trained to extract tone from input content. The tone embedding system receives a set of multimodal input content associated with an entity, and a content generation prompt. Based on the content generation prompt, the one or more generative content models produce generated content. Further, the neural network is employed to generate an entity embedding capturing a tone conveyed by the set of multimodal input content, as well as a content embedding capturing a tone conveyed by the generated content. The generated content is output based on a degree of alignment between the entity embedding and the content embedding meeting a tone alignment threshold.

20 Claims, 11 Drawing Sheets

INFERRING TONE CONVEYED BY DIGITAL CONTENT

BACKGROUND

Entities, such as brands, people, businesses, and organizations, publish digital content online via online publication channels, e.g., home websites, third-party online marketplaces, social media platforms, etc. Oftentimes, an entity carefully builds a tone and/or brand voice by consistently publishing digital content that aligns with the tone and/or brand voice over long periods of time, e.g., years. Due to the difficult and time consuming nature of establishing a well-defined and distinct tone, strict tone alignment policies are often implemented by entities. These policies call for each piece of digital content published online by an entity to strictly align with the entity's tone.

SUMMARY

A tone embedding system includes a neural network trained to extract tone conveyed by input content. During training, training data is received including different sets of multimodal input content paired with output labels indicating corresponding entities with which the different sets of multimodal input content are paired. Using supervised learning, the tone embedding system trains the neural network to classify the different sets of multimodal input content as belonging to the corresponding entities based on the training data.

During inference, the tone embedding system receives a content generation prompt, and employs one or more generative content models to produce generated content based on the content generation prompt. In addition, the tone embedding system receives a set of multimodal input content associated with a particular entity of the corresponding entities. The multimodal input content includes, for instance, content published online via one or more online publication channels of the particular entity.

Using the trained neural network, the tone embedding system classifies the set of multimodal input content as belonging to the particular entity. Further, the tone embedding system extracts an entity embedding that includes or is based on the output values produced by neurons of the trained neural network in classifying the set of multimodal input content. Similarly, the trained neural network classifies the generated content as belonging to one of the corresponding entities. Moreover, the tone embedding system extracts a content embedding that includes the output values produced by neurons of the trained neural network in classifying the set of multimodal input content. The entity embedding captures a first tone conveyed by the set of multimodal input content, while the content embedding captures a second tone conveyed by the generated content.

In accordance with the described techniques, the tone embedding system computes a degree of alignment between the entity embedding and the content embedding using a similarity metric, and compares the degree of alignment to a tone alignment threshold. If the degree of alignment meets the tone alignment threshold, the tone embedding system outputs the generated content. Otherwise the content generation prompt is updated, and the tone embedding system is again employed to generated different generated content based on the updated generated content. This process repeats until generated content is produced that meets the tone alignment threshold This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
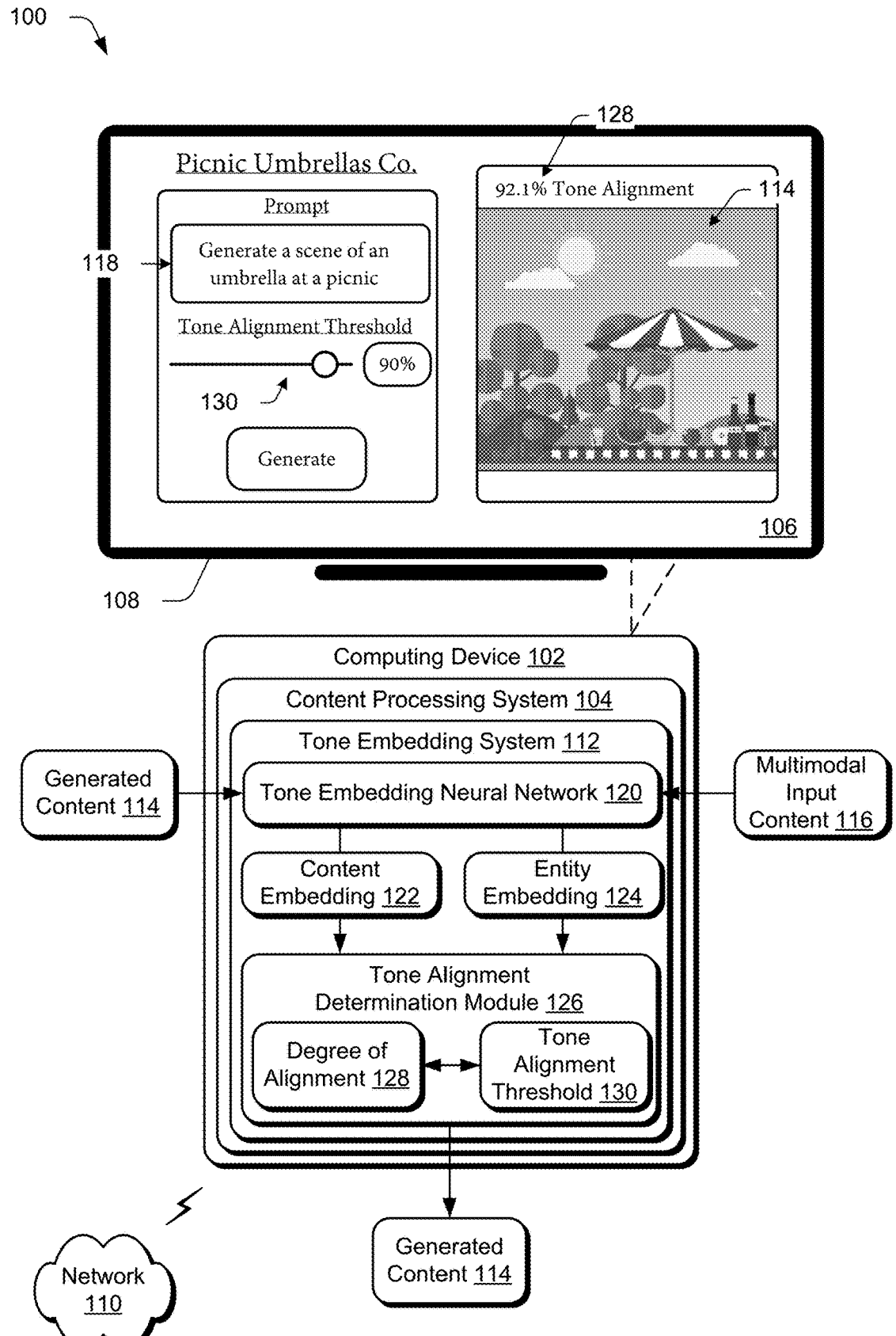
FIG. 1 is an illustration of an environment in an example implementation that is operable to employ techniques described herein for inferring tone conveyed by digital content.

Entities, such as brands, people, businesses, and organizations, publish digital content online via online publication channels. These entities build tone and/or brand voice by consistently publishing digital content online that aligns with the tone and/or brand voice over long periods of time, e.g., years. Notably, the "tone" conveyed by digital content invokes a feeling or mood of a user viewing the digital content, e.g., whether the digital content is funny or serious.

Additionally or alternatively, "tone" includes a visual aesthetic of the digital content, e.g., whether the digital content is visually simple or visually elegant. A distinct and well-defined tone is not only difficult and time consuming for an entity to build, but is also an integral part of the entity's identity. Indeed, digital content adhering to an entity's distinct and well-defined tone serves as an identifier of the entity, even without an explicit identifier (e.g., a name or logo) of the entity. For at least these reasons, entities often implement strict tone alignment policies calling for each piece of digital content published online to strictly adhere to the entity's tone.

Generative artificial intelligence (AI) models are machine learning models that generate content (e.g., textual content, image content, video content, and/or audio content) based on a content generation prompt. By automating the content generation process, generative AI models reduce and/or eliminate the time-consuming and tedious process of manually generating digital content for publication online. However, conventional content generation techniques fail to account for an entity's tone and/or brand voice during the content generation process, often leading to generated content that is out of alignment with an entity's tone. Accordingly, entities with strict tone adherence policies often elect to leverage manual content generation techniques, thereby missing out on the efficiencies enabled by generative AI.

To overcome the limitations of conventional techniques, techniques for inferring tone conveyed by digital content are described herein. In the following discussion, an example is discussed in which a brand (e.g., an entity) requests a tone embedding system to generate content for publication via a social media channel, e.g., an online publication channel. In accordance with the described techniques, the tone embedding system receives a content generation prompt instructing the tone embedding system to produce generated content based on the content generation prompt. In response, the tone embedding system conditions one or more generative content models on the content generation prompt, and the generative content models produce generated content.

Broadly, the generative content models are pre-trained machine learning models, e.g., generative text models, generative image models, generative video models, and/or generative video models. In one or more implementations, the generative content models which are leveraged for the task of generating content to be published via the social media channel of the brand are refined using reinforcement learning. More specifically, the generative content models are refined to increase the rate at which one or more objectives (e.g., clicks, likes, comments) are converted by consumers of digital content via the social media channel of the brand. The learning process is based, in part, on collected user interaction data of users that have accessed digital content of the brand via the social media channel.

In accordance with the described techniques, the tone embedding system includes a neural network that is trained to extract tone from input content. As part of the training process, the neural network receives training data including different sets of multimodal input content paired with corresponding entities (including the brand). By way of example, the training data includes training pairs each representing a different entity of a plurality of entities. A respective training pair, therefore, includes an output label indicating an entity, and a set of multimodal input content published online by the entity. Using supervised learning, the tone embedding system trains the neural network to classify the different sets of multimodal input content as belonging to the corresponding entities.

Once trained, the neural network receives, as input, the generated content produced by the generative content models, and a set of multimodal input content associated with the brand. The multimodal input content is retrieved from one or more online publication channels of the brand, and includes multiple forms of input content, e.g., text, image, audio, and video. Examples of the multimodal input content of the brand include, but are not limited to, social media posts posted via social media accounts of the brand, content obtained from a home website (e.g., a bespoke online store) of the brand, product images and descriptions retrieved from listings of products offered for sale via the home website and/or a third-party online marketplace, targeted online advertisements of products offered for sale by the brand, etc.

In accordance with the described techniques, the trained neural network classifies the set of multimodal input content as belonging to the brand, and classifies the generated content as belonging to one of the entities. Further, the neural network extracts an entity embedding that includes, or is based on, the output values produced by neurons of the neural network in classifying the set of multimodal input content. The entity embedding captures a tone conveyed, collectively, by the set of multimodal input content, and is conceptualizable as quantifying the tone and/or brand voice of the brand across the brand's online footprint. In addition, the neural network extracts a content embedding that includes the output values produced by neurons of the neural network in classifying the generated content. The content embedding quantifies the tone conveyed by the generated content.

Using a similarity metric (e.g., cosine similarity, Euclidean distance), the tone embedding system determines a degree of alignment between the entity embedding and the content embedding. Conceptually, the degree of alignment quantifies how close the tone conveyed by the generated content is to the brand voice of the brand. Further, the tone embedding system compares the degree of alignment to a tone alignment threshold. In one or more implementations, the tone alignment threshold is manually specified by the brand (e.g., a user representing the brand) via a user interface.

Additionally or alternatively, a tone alignment threshold is learned for content that is published via the social media channel of the brand using reinforcement learning. More specifically, the tone alignment threshold is refined to increase the rate at which one or more objectives (e.g., clicks, likes, comments) are converted by consumers of digital content via the social media channel. The learning process is based, in part, on collected user interaction data of users that have accessed digital content of the brand via the social media channel.

If the degree of alignment does not meet the tone alignment threshold, the tone embedding system is configured to add, to the content generation prompt, one or more tone attributes associated with the brand. In one or more implementations, the tone attributes correspond to a curated list of tone attributes provided directly by the brand (e.g., a user representing the brand) via a user interface. Additionally or alternatively, the tone attributes are extracted from the entity embedding of the brand using a machine learning model. During training, for instance, the machine learning model receives training pairs. Each training pair includes a training embedding generated using the neural network based on a set of multimodal input content associated with an entity, and a curated list of attributes provided by the entity that captures the entity's tone. Based on the training data, the tone embedding system uses supervised learning to train the machine learning model to extract attributes from embeddings generated using the neural network.

The updated content generation prompt is then used to condition the generative content models to generate different generated content. Generated content is iteratively produced until the generated content meets the tone alignment threshold, at which point the generated content is output, e.g., for display in a user interface.

In contrast with conventional techniques, the techniques discussed herein accurately quantify tone conveyed by an entity's online footprint, and output AI generated content solely if the generated content aligns with the tone. By doing so, the described techniques enable entities with strict tone alignment policies to leverage generative AI to produce tone-aligned generated content. In other words, the described techniques automate the time-consuming and tedious process of manually generating content in accordance with a strict tone alignment policy. Accordingly, the described techniques streamline content generation and publication workflows, which conserves computational resources and improves computational efficiency for devices implementing the content embedding system.

Term Descriptions

As used herein, the term "machine learning model" refers to a computer representation that is tunable (e.g., trainable) based on inputs to approximate unknown functions. By way of example, the term "machine learning model" includes a model that utilizes algorithms to learn from, and make predictions on, known data by analyzing the known data to learn to generate outputs that reflect patterns and attributes of the known data. According to various implementations, such a machine learning model uses supervised learning, semi-supervised learning, unsupervised learning, reinforcement learning, and/or transfer learning. For example, a machine learning model is capable of including, but is not limited to, clustering, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. By way of example, a machine learning model makes high-level abstractions in data by generating data-driven predictions or decisions from the known input data.

As used herein, the term "neural network" refers to a particular type of machine learning model including interconnected nodes (e.g., neurons) organized into layers, e.g., an input layer, one or more hidden layers, and an output layer. During a training phase, various parameters of the neural network are learned, including activation weights between the interconnected neurons. During an inference phase, an input is propagated through the various layers of the neural network. In particular, each respective neuron of a respective layer receives inputs from a previous layer of the network, generates weighted inputs by applying the learned activation weight to the inputs, and produces an output value by applying an activation function to the weighted inputs.

As used herein, the term "tone" refers to the general character, attitude, identity, and/or visual aesthetics conveyed by digital content. In examples in which the entity is a brand, the term "tone" is synonymous with the terms "brand voice," "brand identity," and/or "brand message." Various characteristics or attributes of tone conveyed by digital content are visual, such as whether the digital content is visually simple or visually elegant, whether the digital content is colorful or primarily black and white, and/or whether the digital content is organized with clean lines and breaks. Additionally or alternatively, characteristics or attributes of tone conveyed by digital content include feelings or moods invoked by a user consuming the digital content, such as how funny or serious the digital content is, how formal or casual the digital content is, how respectful or irreverent the input content is, how direct or enthusiastic the digital content is, and so forth. These examples, however, are not to be construed as limiting, and instead, a multitude of characteristics or attributes of tone are conveyable by digital content.

As used herein, the term "entity" is a person, a brand (e.g., a purveyor of goods or services, a social media brand, etc.), a business, an organization, or any other entity that makes digital content available to the public via one or more online publication channels. The tone of an entity is conveyed, collectively, by the digital content that is published online via the one or more online publication channels of the entity.

As used herein, the term "online publication channel" refers to a digital service that enables entities to publish digital content online for consumption by consumers. Examples of online publication channels of an entity include, but are not limited to a home website (e.g., a bespoke online store) of the entity where the entity offers products and/or services for sale, a third party online marketplace where product listings of the entity are published, online advertisements of products or services offered for sale by the entity, social media pages or accounts associated with the entity, and so on.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques described herein for inferring tone conveyed by digital content. The illustrated environment 100 includes a computing device 102, which is configurable in a variety of ways. The computing device 102, for instance, is configurable as a desktop computer, a laptop computer, a mobile device (e.g., assuming a handheld configuration such as a tablet or mobile phone as illustrated), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 11.

The computing device 102 is illustrated as including a content processing system 104. The content processing system 104 is implemented at least partially in hardware of the computing device 102 to process and transform digital content. Such processing includes creation of the digital content, modification of the digital content, and rendering of the digital content in a user interface 106 for output, e.g., by a display device 108. Although illustrated as implemented locally at the computing device 102, functionality of the content processing system 104 is also configurable as whole or part via functionality available via the network 110, such as part of a web service or "in the cloud."

An example of functionality incorporated by the content processing system 104 to process the digital content is illustrated as a tone embedding system 112. As shown, the tone embedding system 112 receives, as input, generated content 114 and multimodal input content 116 associated with an entity. The generated content 114 includes one or more of image content, video content, textual content, and audio content that has been generated (e.g., based on a prompt 118) by one or more generative machine learning models. In addition, multimodal input content 116 includes image data, video data, textual data, and/or audio data retrieved from the one or more online publication channels of the entity.

As shown, the generated content 114 and the multimodal input content 116 are provided, as input, to a tone embedding neural network 120. Broadly, the tone embedding neural network 120 is trained to extract tone from input content. More specifically, the tone embedding neural network receives input content in any form (e.g., text, image, video, and/or audio), and outputs an embedding that quantifies a tone conveyed by the input content. Given this, the tone embedding neural network 120 generates a content embedding 122 based on the generated content 114, which captures a tone conveyed by the generated content 114. In addition, the tone embedding neural network 120 generates an entity embedding 124 based on the multimodal input content 116, which captures a tone conveyed, collectively, by the multimodal input content 116.

In accordance with the described techniques, the content embedding 122 and the entity embedding 124 are provided, as input, to a tone alignment determination module 126, which computes a degree of alignment 128 between the content embedding 122 and the entity embedding 124. If the degree of alignment 128 meets a tone alignment threshold 130, the tone alignment determination module 126 outputs the generated content 114. If, however, the degree of alignment 128 does not meet the tone alignment threshold 130, the tone alignment determination module 126 instructs the tone embedding system 112 to update the prompt 118 and generate different generated content 114 based on the updated prompt.

Conventional content generation techniques fail to account for an entity's tone/brand voice, and as such, these techniques generate content that fails to adhere to the entity's voice, message, identity, and visual aesthetic. For this reason, entities having strict tone alignment policies often avoid the use of generative machine learning models for generating content to be published online, instead electing to generate this content manually. In contrast, the described techniques provide a tone embedding neural network 120 that quantifies the tone conveyed, collectively, by the multimodal input content 116 of the entity (representing the tone of the entity's online footprint). Further, the described techniques leverage generative machine learning models to produce generated content 114, and solely output the generated content 114 if the generated content aligns with the tone of the entity. Accordingly, the described techniques automate the tedious and time-consuming process of manually generating content that aligns with an entity's tone, which conserves computational resources and improves computational efficiency on the computing device 102.

Figure 2:
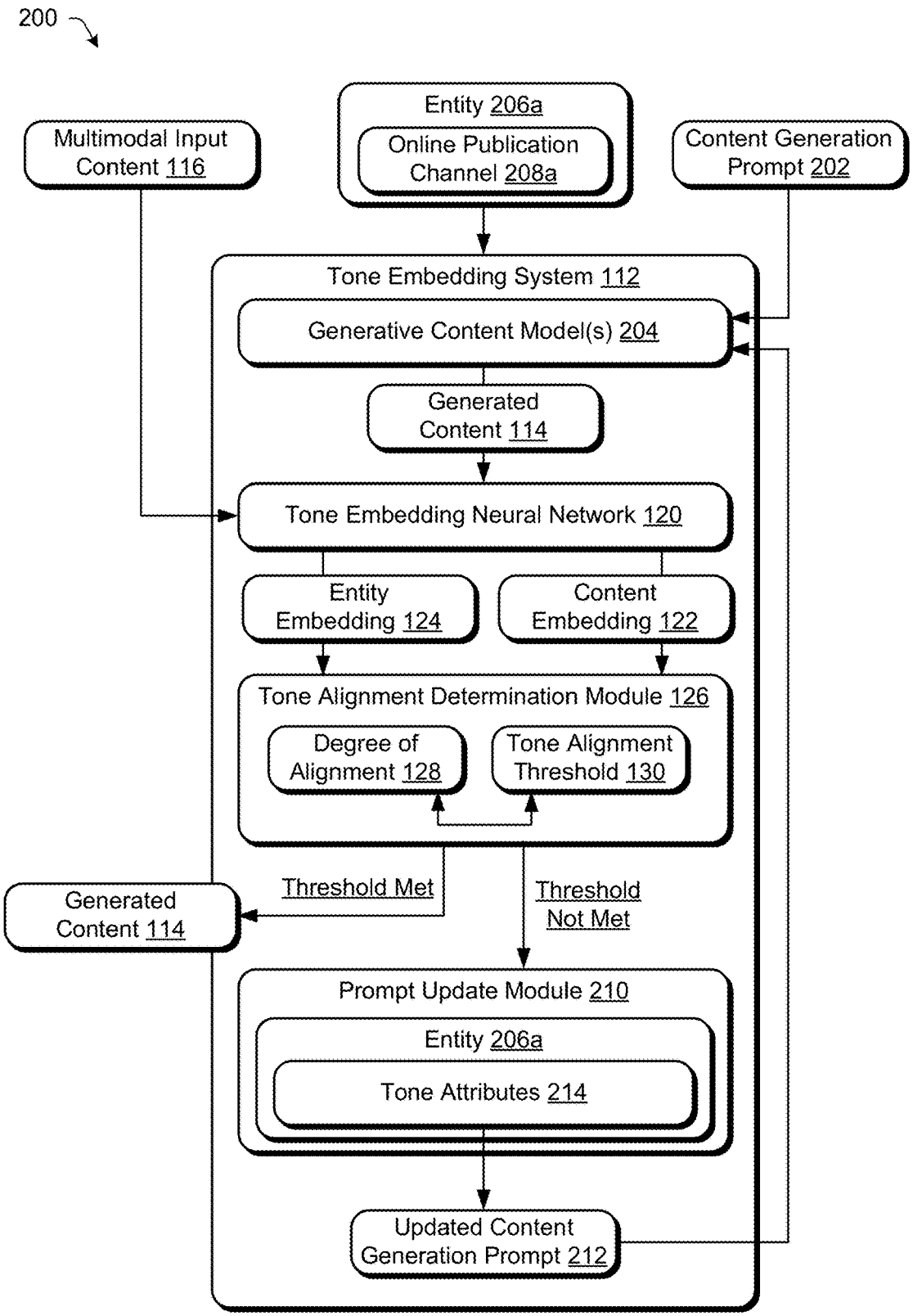
FIG. 2 depicts a system in an example implementation showing operation of a tone embedding system to output generated content based on tone alignment.

FIG. 2 depicts a system 200 in an example implementation showing operation of a tone embedding system to output generated content based on tone alignment. As shown, the tone embedding system 112 receives a content generation prompt 202, which instructs generative content models 204 of the tone embedding system 112 to produce the generated content 114. In one example, the content generation prompt 202 includes an image of a product and text instructing a generative image model to generate a new background for the image. In another example, the content generation prompt 202 includes a video (having audio data and visual data), and text instructing a generative text model to generate a textual caption for the video. In yet another example, the content generation prompt 202 includes text instructing a generative video model and a generative audio model to generate a video that includes video content and audio content. Accordingly, the content generation prompt 202 includes any combination of text, images, video, and audio, and instructs generative content models 204 of the tone embedding system 112 to generate any combination of text content, image content, video content, and audio content.

In accordance with the described techniques, the tone embedding system 112 is employable by a plurality of entities, and each of the entities publish content via a plurality of online publication channels. As shown, the tone embedding system 112 receives an indication of a particular entity 206a that is requesting the generated content 114, and a particular online publication channel 208a via which the generated content 114 is to be published.

In addition, the tone embedding system 112, receives multimodal input content 116 associated with the entity 206a. Broadly, the multimodal input content 116 of the entity 206a includes one or more of image content, video content, textual content, and audio content retrieved from one or more of the publication channels of the particular entity 206a. Examples of the multimodal input content 116 associated with an entity include, but are not limited to, website content published via the home website of the entity, product images and/or product descriptions obtained from online listings published via the home website of the entity or a third party online marketplace, content included in targeted advertisements of the entity, and so on.

More specifically, the one or more generative content models 204 of the tone embedding system 112 receive the content generation prompt 202 as input, and output the generated content 114 based on the content generation prompt 202. The generative content models 204 include generative text models, generative image models, generative video models, and/or generative audio models. In particular, the generative content models 204 are pre-trained machine learning models that take unformatted input content in any form (e.g., text, images, video, audio), and output generated content 114 based on the unformatted input content. Examples of the pre-trained generative content models 204 include, but are not limited to, VQ-VAE2 and Vid2Vid models for video generation, GPT-3, GPT-3.5, and T5 models for text generation, DALL-E and DALL-E 2 models for image generation, and WaveGan and Tacotron 2 for audio generation and/or speech synthesis. As further discussed below with reference to FIG. 3, the generative content models 204 are refined to produce generated content 114 which, when published via the online publication channel 208a of the entity 206a, influence one or more objectives of the entity 206a.

Figure 3:
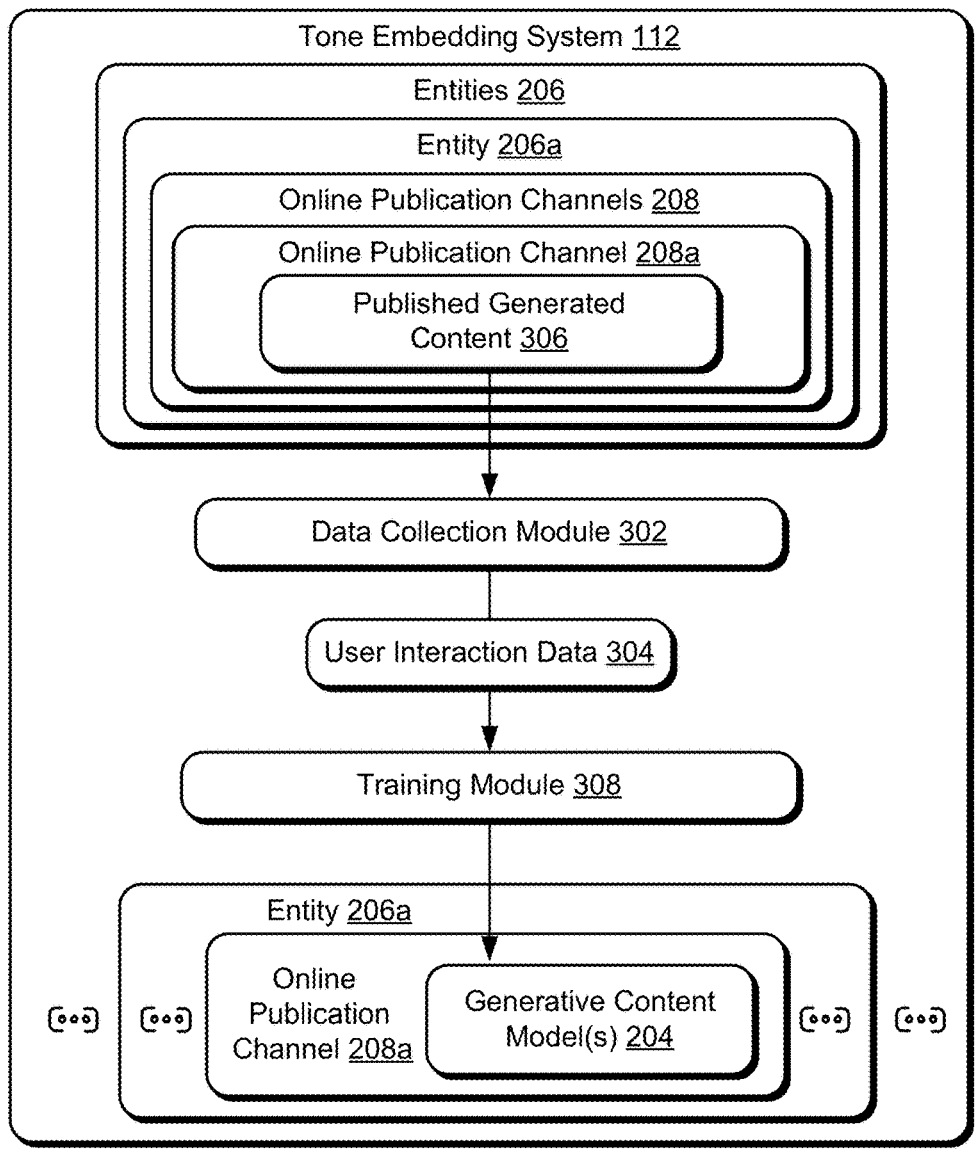
FIG. 3 depicts a system in an example implementation showing operation of a training module to refine a particular set of generative content models associated with an online publication channel of an entity.

In particular, FIG. 3 depicts a system 300 in an example implementation showing operation of a training module to refine a particular set of generative content models associated with an online publication channel of an entity. As mentioned above, the tone embedding system 112 is employable by a plurality of entities 206, and each of the entities 206 publish content via a plurality of online publication channels 208. Furthermore, each online publication channel 208 of a respective entity 206 includes a set of generative content models 204.

To refine the generative content models 204 associated with the particular publication channel 208a of the particular entity 206a, a data collection module 302 is employed to collect user interaction data 304 associated with published generated content 306. Here, the published generated content 306 is content that has been generated using the one or more generative content models 204 of the publication channel 208a, and subsequently published via the publication channel 208a. Further, the user interaction data 304 includes rates at which one or more objectives are converted by consumers accessing the published generated content 306 via the publication channel 208a. For example, the objectives include user accesses to the published generated content 306 (e.g., clicks), likes and/or comments associated with the published generated content 306, accesses of the published generated content 306 that lead to subscriptions to the entity 206a, accesses of the published generated content 306 that lead to purchase initiations of products featured in the published generated content 306, and so on.

In accordance with the described techniques, a training module 308 is employed to refine, using reinforcement learning, the generative content models 204 of the online publication channel 208a based on the user interaction data 304. To do so, the training module 308 compares the rates at which the one or more objectives are converted by consumers accessing the published generated content 306 to a threshold rate. If the rates of conversion meet or exceed the threshold rate, the training module 308 positively reinforces the generative content models 204 of the publication channel 208a. If, however, the rates of conversion are below the threshold rate, the training module 308 negatively reinforces the generative content models 204 of the publication channel 208a.

It should be noted that the above-described refinement process is performed for each set of generative content models 204 associated with each different entity 206 and publication channel 208 pairing. As a result, each different entity 206 and online publication channel 208 pairing includes a set of generative content models 204 that are refined to produce generated content 114 which optimizes the likelihood of occurrence of the one or more objectives for a consumer population that is specific to the pairing.

Returning to FIG. 2, the tone embedding system 112 selects, as the generative content models 204 to produce the generated content 114, the particular set of generative content models 204 having been refined for the publication channel 208a of the entity 206a. Further, the particular set of generative content models 204 receives the content generation prompt 202 as conditioning, and outputs the generated content 114 to the tone embedding neural network 120.

In accordance with the described techniques, the tone embedding neural network 120 receives the generated content 114 and the multimodal input content 116 of the entity 206a. Based on the multimodal input content 116, the tone embedding neural network 120 generates an entity embedding 124 capturing a tone conveyed, collectively, by the multimodal input content 116. The entity embedding 122 is conceptualizable as quantifying the tone and/or brand voice of the entity 206a across the entity's online footprint. In addition, the tone embedding neural network 120 generates a content embedding 122 capturing a tone conveyed by the generated content 114. Further discussion regarding how the tone embedding neural network 120 is trained and leveraged to generate embeddings that capture tone conveyed by input content is provided below with reference to FIGS. 4 and 5.

Figure 4:
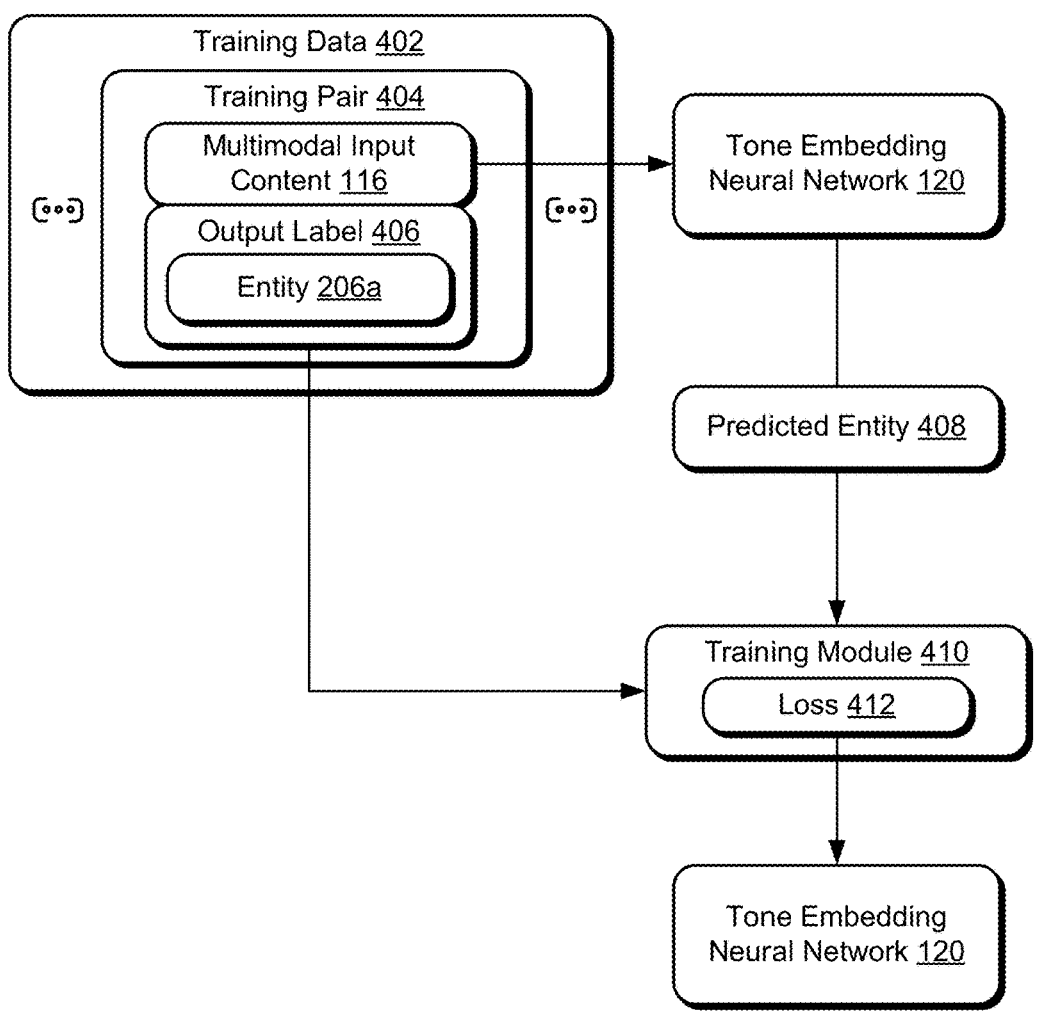
FIG. 4 depicts a system in an example implementation showing operation of a training module to train a tone embedding neural network to classify input content as belonging to a particular entity.

In particular, FIG. 4 depicts a system 400 in an example implementation showing operation of a training module to train a tone embedding neural network to classify input content as belonging to a particular entity. During training, the tone embedding neural network 120 receives training data 402 including different sets of multimodal input content 116 paired with corresponding entities 206. More specifically, the training data 402 includes a plurality of training pairs 404. As shown, a respective training pair 404 includes a set of multimodal input content 116 associated with the entity 206a, and an output label 406 indicating the corresponding entity 206a with which the multimodal input content 116 is paired.

To train the network, the multimodal input content 116 associated with the entity 206a is provided, as input, to the tone embedding neural network 120. It should be noted that the multimodal input content 116 provided to the tone embedding neural network 120 excludes explicit entity identifiers, such as entity logos, entity names, unique stock keeping units (SKUs) of the entity, etc. In one or more implementations, the multimodal input content 116 is converted to a vector representation of the multimodal input content 116 using one or more vectorization techniques (e.g., encoder models, three-dimensional neural networks, contrastive language-image pre-training (CLIP) models, Wave2Vec 2.0 models, Word2Vec models, and so on) before being provided to the tone embedding neural network. For instance, the vector representation of the multimodal input content 116 includes a plurality of pieces of the multimodal input content 116 having been vectorized, and concatenated together. In various implementations, the vector representation of the multimodal input content 116 is condensed using a dimensionality reduction technique (e.g., principal component analysis) before being provided to the tone embedding neural network 120.

During training, the tone embedding neural network 120 is configured to classify the multimodal input content 116 as belonging to a predicted entity 408 of the plurality of entities 206. Further, the predicted entity 408 and the output label 406 are provided to a training module 410, which computes a loss 412 between the predicted entity 408 and the entity 206a indicated by the output label 406 using a loss function, e.g., cross-entropy loss. To enable such a loss comparison, the output label 406 and the predicted entity 408 are representable as constant length vectors, in which each different vector position corresponds to an entity 206 of the plurality of entities 206. In particular, the vector representing the output label 406 is populated with a binary '1' in the vector position indicating the entity 206a, and with a binary '0' in the remaining vector positions. Similarly, the vector representing the predicted entity 408 is populated with a binary '1' in the vector position indicating the predicted entity 408, and with a binary '0' in the remaining vector positions.

After the loss 412 is computed, the training module 410 adjusts parameters (e.g., including activation weights of neurons) of the tone embedding neural network 120 to minimize the loss 412. The activation weights are iteratively adjusted on different training pairs 404 of the training data 402 until the loss 412 converges to a minimum, a threshold number of iterations have completed, or a threshold number of epochs have been processed. In sum, the training module 410 uses supervised learning to train the tone embedding neural network 120 to classify the different sets of the multimodal input content 116 as belonging to the corresponding entities 206.

Figure 5:
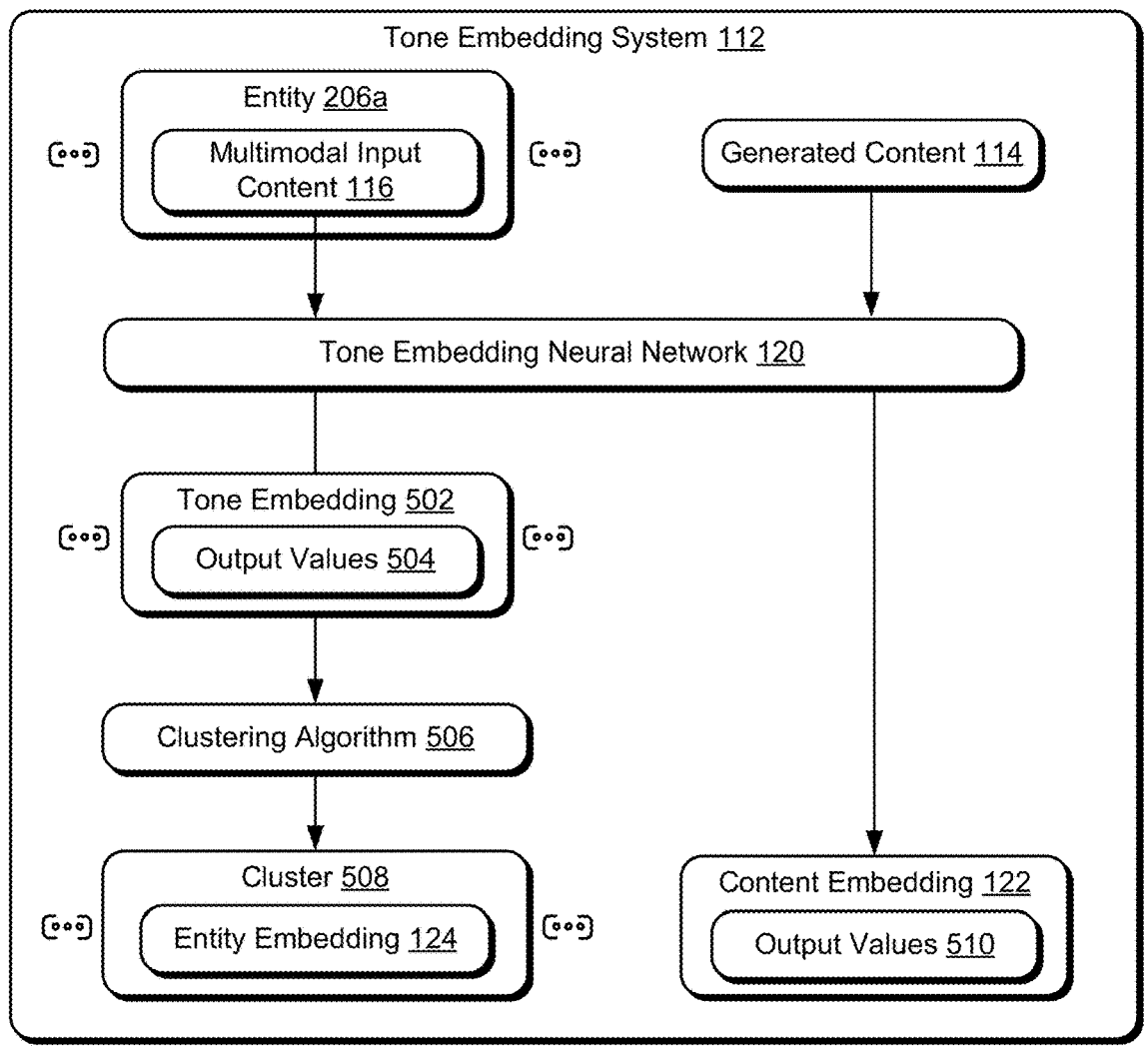
FIG. 5 depicts a system in an example implementation showing operation of the tone embedding neural network to generate an entity embedding associated with an entity, and a content embedding associated with generated content.

FIG. 5 depicts a system 500 in an example implementation showing operation of the tone embedding neural network to generate an entity embedding associated with an entity, and a content embedding associated with generated content. To generate the entity embedding 124 of the particular entity 206a, the trained tone embedding neural network 120 is employed to classify the different sets of the multimodal input content 116 as belonging to one of the corresponding entities 206. It should be noted that, during the classification task, a majority of the sets of multimodal input content 116 are correctly classified as belonging to the corresponding entities 206 with which the content sets are paired. However, it is possible for the tone embedding neural network 120 to misclassify a set of multimodal input content 116 as belonging to a different entity 206 due to similarities between the tones conveyed by the different sets of multimodal input content 116.

Furthermore, the tone embedding neural network 120 extracts tone embeddings 502 associated with the corresponding entities 206, such that the tone embeddings 502 include output values 504 produced by neurons of the tone embedding neural network 120 in classifying the different sets of the multimodal input content 116. To generate a tone embedding 502 of a particular entity 206a, for instance, the tone embedding neural network 120 receives the vector representation of the multimodal input content 116 associated with the particular entity 206a, e.g., excluding the explicit entity identifiers. Based on the vector representation of the multimodal input content 116, the tone embedding neural network 120 classifies the multimodal input content 116 as belonging to one of the entities 206.

During the classification task, the vector representation is propagated through an input layer, one or more hidden layers, and an output layer of the tone embedding neural network 120. Notably, the hidden layers and the output layer include the activation weights that are learned through the training process discussed above with reference to FIG. 4 When the vector representation is propagated through the tone embedding neural network 120, a neuron of a particular layer (e.g., a hidden layer or an output layer) receives inputs from a previous layer of the network, generates weighted inputs by applying the learned activation weight of the neuron to the inputs, and produces an output value by applying an activation function to the weighted inputs. Here, the tone embedding 502 of the entity 206a is a vector of numbers including the output values 504 produced by the neurons at the hidden layers and the output layers of the tone embedding neural network 120. Tone embeddings 502 are similarly extracted from the remaining sets of multimodal input content 116 associated with the remaining entities 206.

As shown, the tone embeddings 502 are provided as input to a clustering algorithm 506, which groups the tone embeddings 502 into clusters 508 based on similarities between the tone embeddings 502. Each cluster 508, for instance, includes the tone embeddings 502 of a group of one or more similar entities 206. By way of example, a first cluster 508 includes the tone embeddings 502 of designer brands, a second cluster 508 includes the tone embeddings 502 of budget clothing brands, a third cluster 508 includes the tone embeddings 502 of social media fashion influencers, and so on. As shown, each of the clusters 508 includes an entity embedding 124 which is a representative tone embedding capturing the tone conveyed by the entities 206 in the cluster 508. In one or more implementations, the tone embedding system 112 outputs, as the representative entity embedding 124 for a cluster 508, an average of the tone embeddings 502 within the cluster 508, e.g., a centroid tone embedding.

To generate the content embedding 122 of the generated content 114, the trained tone embedding neural network 120 is employed to classify the generated content 114 as belonging to one of the corresponding entities 206. Further, the tone embedding neural network 120 outputs, as the content embedding 122, a vector of numbers including the output values 510 produced by neurons of the tone embedding neural network 120 in classifying the generated content 114.

Returning to FIG. 2, the entity embedding 124 and the content embedding 122 of are provided to the tone alignment determination module 126. In accordance with the described techniques, the tone alignment determination module 126 is configured to determine a degree of alignment 128 between the entity embedding 124 and the content embedding 122 using any suitable similarity metric, e.g., cosine similarity, Euclidean distance, dot product similarity, etc. In the example system 200, it is the representative entity embedding 124 of the cluster 508 into which the tone embedding 502 of the entity 206a is grouped that is used as a basis for determining the degree of alignment 128. However, it is to be appreciated that the tone alignment determination module 126 uses the tone embedding 502 of the entity 206a as a basis for determining the degree of alignment 128 in variations.

Moreover, the tone alignment determination module 126 compares the degree of alignment 128 to a tone alignment threshold 130. In one or more implementations, the entity 206a requesting the generated content 114 provides the tone alignment threshold 130 directly, e.g., via user input to the user interface 106. Additionally or alternatively, a tone alignment threshold 130 specific to the publication channel 208a of the entity 206a is learned through reinforcement learning, such that content which meets the learned tone alignment threshold 130 influences one or more objectives of the entity 206a, as further discussed below with reference to FIG. 6.

Figure 6:
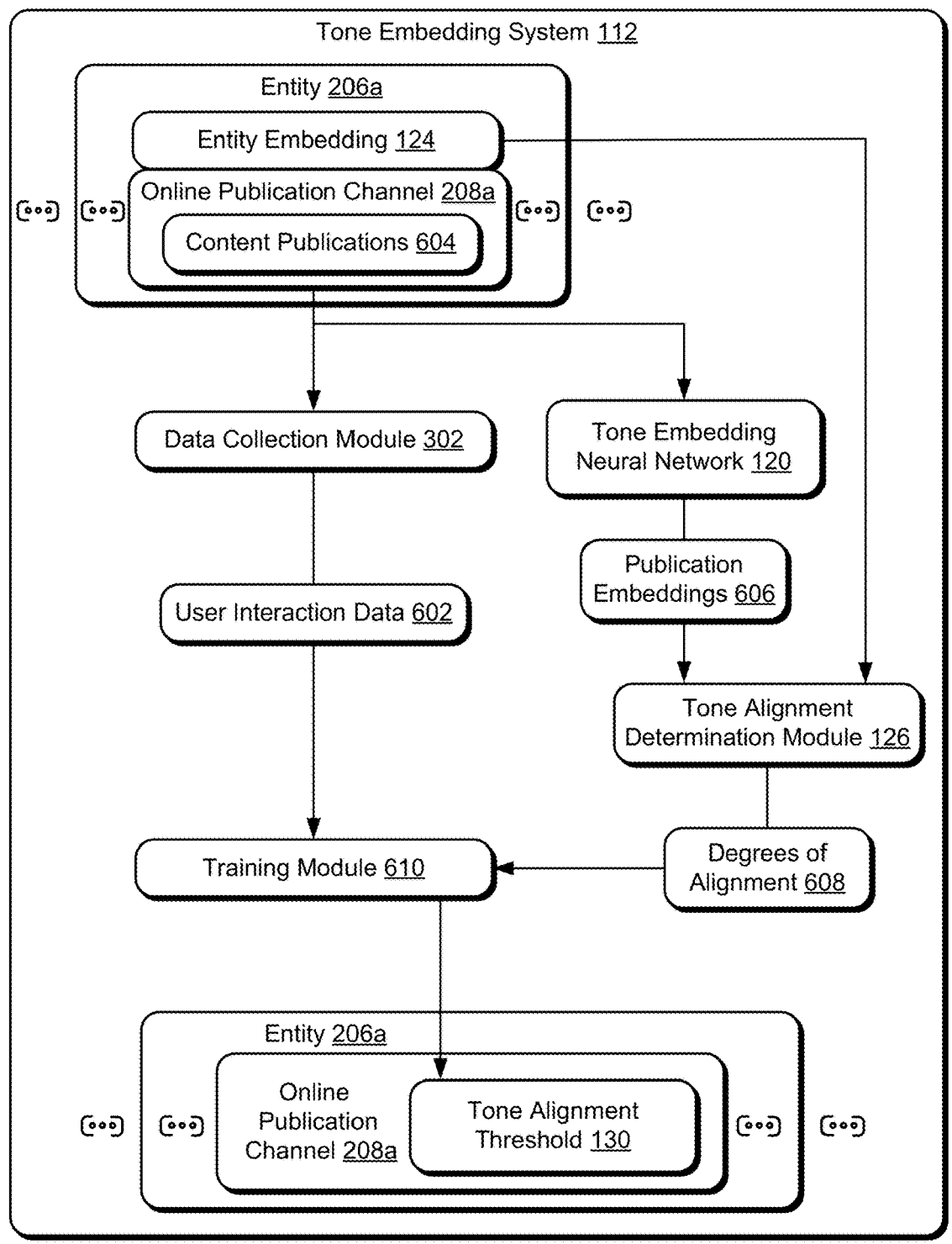
FIG. 6 depicts a system in an example implementation showing operation of a training module to learn a tone alignment threshold specific to a publication channel of an entity.

In particular, FIG. 6 depicts a system 600 in an example implementation showing operation of a training module to learn a tone alignment threshold specific to a publication channel of an entity. To learn the tone alignment threshold 130 associated with the online publication channel 208a of the entity 206a, the data collection module 302 collects user interaction data 602 associated with content publications 604 published via the online publication channel 208a by the entity 206a. Here, the content publications 604 include or correspond to the published generated content 306, and/or content published via the online publication channel 208a that was manually generated or otherwise not generated using the generative content models 204.

Similar to the user interaction data 304, the user interaction data 602 includes rates at which one or more objectives are converted by consumers accessing the content publications 604 via the online publication channel 208a. For example, the objectives include user accesses to the content publications 604 (e.g., clicks), likes and/or comments associated with the content publications 604, accesses of the content publications 604 that lead to subscriptions to the entity 206a, accesses of the content publications 604 that lead to purchase initiations of a product featured in the content publications 604, and so on.

As shown, the content publications 604 are additionally provided, as input, to the trained tone embedding neural network 120. Here, the trained tone embedding neural network 120 extracts publication embeddings 606 in accordance with the techniques discussed above with reference to FIG. 4. Further, the tone alignment determination module 126 receives the publication embeddings 606 and the entity embedding 124 of the entity 206a. In accordance with the described techniques, the tone alignment determination module 126 determines degrees of alignment 608 between the publication embeddings 606 and the entity embedding 124 using the similarity metric. Although the entity embedding 124 of the entity 206a is illustrated as being used as a basis for determining the degrees of alignment 608, it is to be appreciated that the tone embedding 502 of the entity 206a is used as a basis for determining the degrees of alignment 608 in variations.

Furthermore, a training module 610 is employed to learn, using reinforcement learning, the tone alignment threshold 130 of the online publication channel 208a based on the user interaction data 602 and the degrees of alignment 608. To do so, the training module 610 compares the degrees of alignment 608 to the rates at which the one or more objectives are converted by consumers accessing the content publications 604. Given a degree of alignment 608 between a publication embedding 606 of a content publication 604 and the entity embedding 124, for instance, the training module 610 determines whether the degree of alignment 608 exceeds a threshold alignment. In addition, the training module 610 determines whether the rates associated with the content publication 604 exceed a threshold rate.

In accordance with the described techniques, the training module 610 increases the tone alignment threshold 130 in the following scenarios: (1) the degree of alignment 608 exceeds the threshold alignment and the rates exceed the threshold rate, and (2) the degree of alignment 608 is below the threshold alignment and the rates are below the threshold rate. In addition, the training module 610 decreases the tone alignment threshold 130 in the following scenarios, (1) the degree of alignment 608 exceeds the threshold alignment and the rates are below the threshold rate, and (2) the degree of alignment 608 is below the threshold alignment and the rates are above the threshold rate.

To fully learn the tone alignment threshold 130 of the online publication channel 208a, the training module 610 repeats the above-described learning process for each of the content publications 604. In addition, the above-described learning process is performed for each set of content publications 604 associated with each different entity 206 and publication channel 208 pairing. As a result, each different entity 206 and online publication channel 208 pairing includes a learned tone alignment threshold 130 that is specific to the consumer population of the pairing.

Returning to FIG. 2, the tone alignment determination module 126 selects, as the tone alignment threshold 130 to be used as a basis for determining whether to output the generated content 114, the tone alignment threshold 130 of the online publication channel 208a of the entity 206a. In some examples in which the tone alignment threshold 130 is specified manually via user input, the manually specified tone alignment threshold 130 overrides the learned tone alignment threshold 130. As shown, the tone alignment determination module 126 outputs the generated content 114 based on the degree of alignment 128 meeting the tone alignment threshold 130. Here, outputting the generated content 114 includes displaying the generated content 114 in the user interface 106 of the display device 108 and/or initiating publishing the generated content 114 via the publication channel 208a of the entity 206a.

If the tone alignment threshold 130 is not met, however, the tone alignment determination module 126 instructs a prompt update module 210 to generate an updated content generation prompt 212. To do so, the prompt update module 210 adds one or more tone attributes 214 associated with the entity 206a to the content generation prompt 202. By way of example, the entity 206a includes a list of tone attributes 214 that capture a tone associated with the entity 206a. In one or more implementations, the list of tone attributes 214 corresponds to a curated list of tone attributes 214 provided directly by the entity 206a requesting the generated content 114. Additionally or alternatively, the list of tone attributes of the entity 206a are extracted from the entity embedding 124 of the entity 206a using a machine learning model, as further discussed below with reference to FIG. 7.

Figure 7:
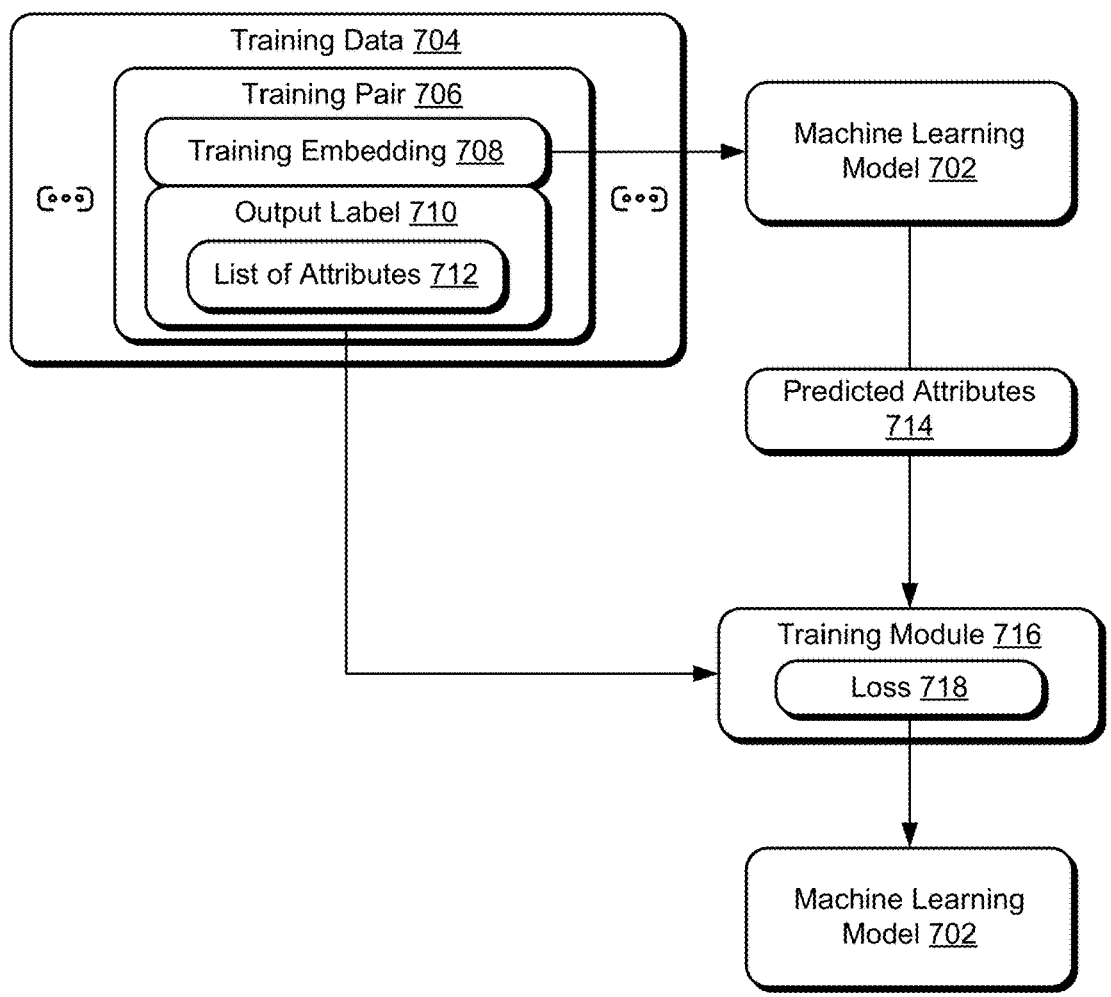
FIG. 7 depicts a system in an example implementation showing operation of a training module to train a machine learning model to extract attributes from embeddings generated using the tone embedding neural network.

In particular, FIG. 7 depicts a system 700 in an example implementation showing operation of a training module to train a machine learning model to extract attributes from embeddings generated using the tone embedding neural network. During training, a machine learning model 702 receives training data 704 including a plurality of training pairs 706. Each training pair 706 includes a training embedding 708 generated using the tone embedding neural network 120 and an output label 710 including a list of attributes 712 associated with the training embedding 708. By way of example, the training embedding 708 corresponds to a tone embedding 502 or an entity embedding 124 of a respective entity 206, and the list of attributes 712 are provided by the respective entity 206, and curated to capture the respective entity's tone and/or brand voice.

As shown, the training embedding 708 of the training pair 706 is provided, as input, to the machine learning model 702, which outputs predicted attributes 714 based on the training embedding 708. The predicted attributes 714 and the output label 710 are provided to a training module 716, which computes a loss 718 between the predicted attributes 714 and the curated list of attributes 712 indicated by the output label 710, e.g., cross-entropy loss. To enable such a loss comparison, the output label 710 and the predicted attributes 714 are representable as constant length vectors, in which each different vector position corresponds to an attribute of a plurality of attributes. In particular, the output label 710 and the predicted attributes 714 are populated with binary values indicating whether each attribute is present in the list of attributes 712 and the predicted attributes 714, respectively.

After the loss 718 is computed, the training module 716 adjusts parameters of the machine learning model 702 to minimize the loss 718. The parameters are iteratively adjusted on different training pairs 706 until the loss 718 converges to a minimum, a threshold number of iterations have completed, or a threshold number of epochs have been processed. In sum, the training module 716 uses supervised learning to train the machine learning model 702 to extract attributes from embeddings generated using the tone embedding neural network 120. After the training phase has completed, the machine learning model 702 is able to extract attributes from tone embeddings 502 and/or entity embeddings 124 that are not represented in the training data 704. In other words, the machine learning model 702 learns to extract attributes from unseen tone embeddings 502 and/or entity embeddings 124.

Returning to FIG. 2, the prompt update module 210 generates an updated content generation prompt 212 using the tone attributes 214 associated with entity 206a requesting the generated content 114. In examples in which the entity 206a has provided a curated list of tone attributes 214 directly (e.g., the entity 206a is represented in the training data 704), the prompt update module 210 generates the updated content generation prompt 212 by adding tone attributes 214 from the curated list to the content generation prompt 202. Otherwise, the tone embedding system 112 feeds the entity embedding 124 or the tone embedding 502 of the entity 206a to the machine learning model 702, which outputs the tone attributes 214 for the entity 206a. Further, the prompt update module 210 adds one or more of the tone attributes 214, as determined by the machine learning model 702, to the content generation prompt 202.

As shown, the updated content generation prompt 212 is then fed back to the generative content models 204. In short, the generative content models 204 produce different generated content 114 based on the updated content generation prompt 202, the tone embedding neural network 120 generates a new content embedding 122 for the different generated content 114, and the tone alignment determination module determines a degree of alignment 128 between the entity embedding 124 and the new content embedding 122. Again, the different generated content 114 is output if the degree of alignment 128 meets the tone alignment threshold 130. Otherwise, the prompt update module 210 again generates an updated content generation prompt 212. This process repeats until generated content 114 is produced that meets the tone alignment threshold 130.

Figure 8:
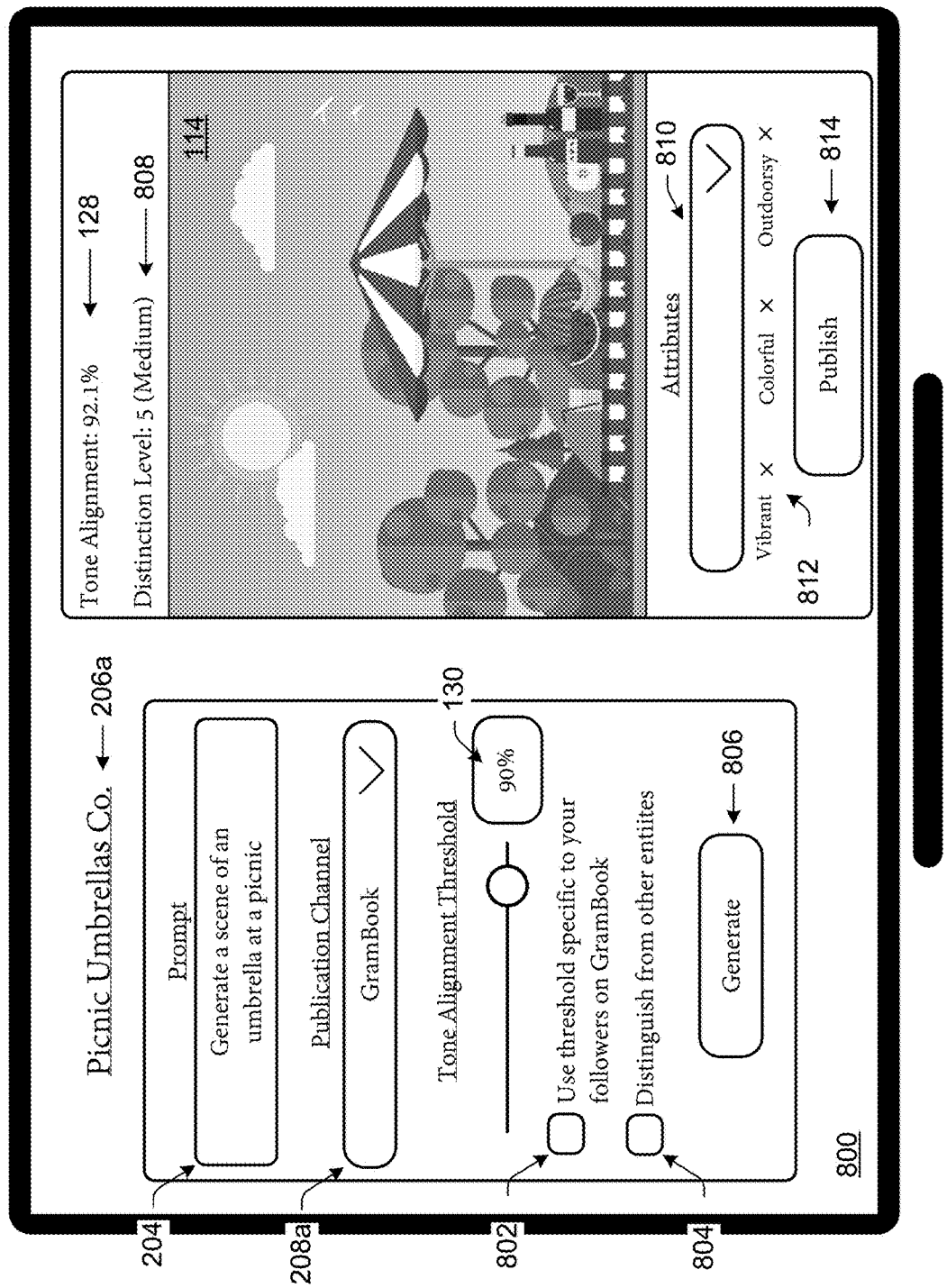
FIG. 8 depicts an example user interface for interacting with the tone embedding system.

FIG. 8 depicts an example user interface 800 for interacting with the tone embedding system. As shown, the entity 206a "Picnic Umbrellas Co." is requesting the tone embedding system 112 to produce generated content 114 that aligns with a tone alignment threshold 130. A first panel of the user interface 800 includes a prompt input region, in which a user has specified (e.g., via text input) the content generation prompt 202 "generate a scene of an umbrella at a picnic." The first panel further includes a publication channel input region, in which a user has specified (e.g., via input to a drop-down menu) the online publication channel 208a "GramBook" as the online publication channel 208a where the generated content 114 is to be published.

Furthermore, the first panel of the user interface 800 includes a tone alignment threshold input region. As shown, there are various manners of specifying the tone alignment threshold 130. In the illustrated example, the user has manually specified a tone alignment threshold 130 of ninety percent via a slider control which enables the user to manually specify the tone alignment threshold 130. Another option for specifying the tone alignment threshold 130 includes the user interface element 802 selectable to "use threshold specific to your followers on GramBook." When the user interface element 802 is selected, the tone embedding system 112 uses the tone alignment threshold 130 that is learned based on the user interaction data 602 of visitors to the entity's page on the publication channel 208a "GramBook," in accordance with the techniques discussed above with reference to FIG. 6.

Yet another option for specifying the tone alignment threshold 130 includes selecting the user interface element 804 to "distinguish from other entities." In scenarios in which the user interface element 804 is selected, the tone alignment threshold 130 is an instruction to output generated content 114 that aligns with the tone conveyed by the entity embedding 124 of the entity 206a to a greater degree than any of the other entity embeddings 124 (of the other entities 206). As part of this, the tone embedding system 112 is employed to determine degrees of alignment 128 between the content embedding 122 of the generated content 114 and each of the entity embeddings 124 of the corresponding clusters 508. Further, the tone embedding system 112 outputs the generated content 114 based on the degree of alignment 128 between the content embedding 122 and the entity embedding 124 associated with the entity 206a being a highest value (indicating a highest degree of similarity) among the determined degrees of alignment 128.

In response to selection of the user interface element 806, the tone embedding system 112 is instructed to output generated content 114 that accords with the tone alignment threshold 130. To produce the generated content 114, the tone embedding system 112 employs the generative content models 204 that are refined based on the user interaction data 304 of visitors to the entity's page on the publication channel 208a "GramBook," in accordance with the techniques discussed above with reference to FIG. 3. Upon producing generated content 114 that meets the tone alignment threshold 130, the tone embedding system 112 outputs the generated content 114 in a second panel of the user interface 800, as shown. In addition, the tone embedding system 112 displays the degree of alignment 128 in the second panel.

In one or more implementations, the tone embedding system 112 additionally displays a distinction level 808 associated with the generated content 114. Broadly, the distinction level 808 represents how similar the content embedding 122 of the generated content 114 is to the entity embedding 124 of a cluster 508 of entities 206 that (1) is most similar to the content embedding 122, and (2) is not the cluster 508 of entities into which the particular entity 206a is grouped. To determine the distinction level 808, the tone embedding system 112 is employed to determine degrees of alignment 128 between the content embedding 122 of the generated content 114 and each of the entity embeddings 124 of the corresponding clusters 508. In addition, the tone embedding system 112 identifies a cluster 508 that has the highest degree of alignment 128 with the generated content 114 from among the determined degrees of alignment 128, excluding the cluster 508 to which the entity 206a belongs. Based on the degree of alignment 128 between the content embedding 122 of the generated content 114 and the entity embedding 124 of the identified cluster 508, the tone embedding system 112 determines a distinction level 808. For example, the distinction level 808 increases based on a lower degree of alignment 128 between the content embedding 122 and the entity embedding 124 of the identified cluster 508, and vice versa.

In scenarios in which the tone alignment threshold 130 is indicated by the user interface element 804 and/or the distinction level 808 is output, the tone embedding system 112 is employed to determine degrees of alignment 128 between the generated content 114 and each entity 206 of the collection of entities 206 by which the tone embedding system 112 is employable, e.g., thousands or hundreds of thousands of entities 206. For at least this reason, the entities 206 are grouped into the clusters 508 of similar entities 206, and a representative entity embedding 124 is determined for each of the clusters 508. Due to this, the tone embedding system 112 does not compute the degrees of alignment 128 between the content embedding 122 and the tone embedding 502 of every entity 206 in the collection. Instead, the tone embedding system 112 solely computes the degrees of alignment 128 between the content embedding 122 and the representative entity embeddings 124 of the corresponding clusters 508. By doing so, the described techniques increase computational speed and reduce computational complexity for these computations.

Also displayed in the second panel of the user interface 800 is an attribute region 810, that includes a plurality of attributes 812 having been identified automatically by the tone embedding system 112 and incorporated into the content generation prompt 202. By way of example, the original content generation prompt 202 did not result in generated content 114 that meets the tone alignment threshold 130. As such, the generated content 114 displayed in the user interface 800 is produced based on an updated content generation prompt 212 incorporating the tone attributes 214 associated with the entity 206a.

Notably, the incorporated tone attributes 214 are either curated and provided directly by the entity 206a, or the incorporated tone attributes 214 are extracted from the entity embedding 124 or the tone embedding 502 of the entity 206a using the machine learning model 702. In accordance with the described techniques, the tone embedding system 112 displays the tone attributes 214 (e.g., the attributes 812) that were incorporated into the content generation prompt 202. In addition, the attribute region 810 includes an input box, in which a user can specify one or more of the tone attributes 214 associated with the entity 206a. In one or more examples, the input box is a drop-down menu including solely the list of tone attributes 214 associated with the entity 206a, while other attributes are omitted. The second panel of the user interface 800 further includes a user interface element 814 that is selectable to cause the generated content 114 to be published via the indicated publication channel 208a.

Example Procedures

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks.

Figure 9:
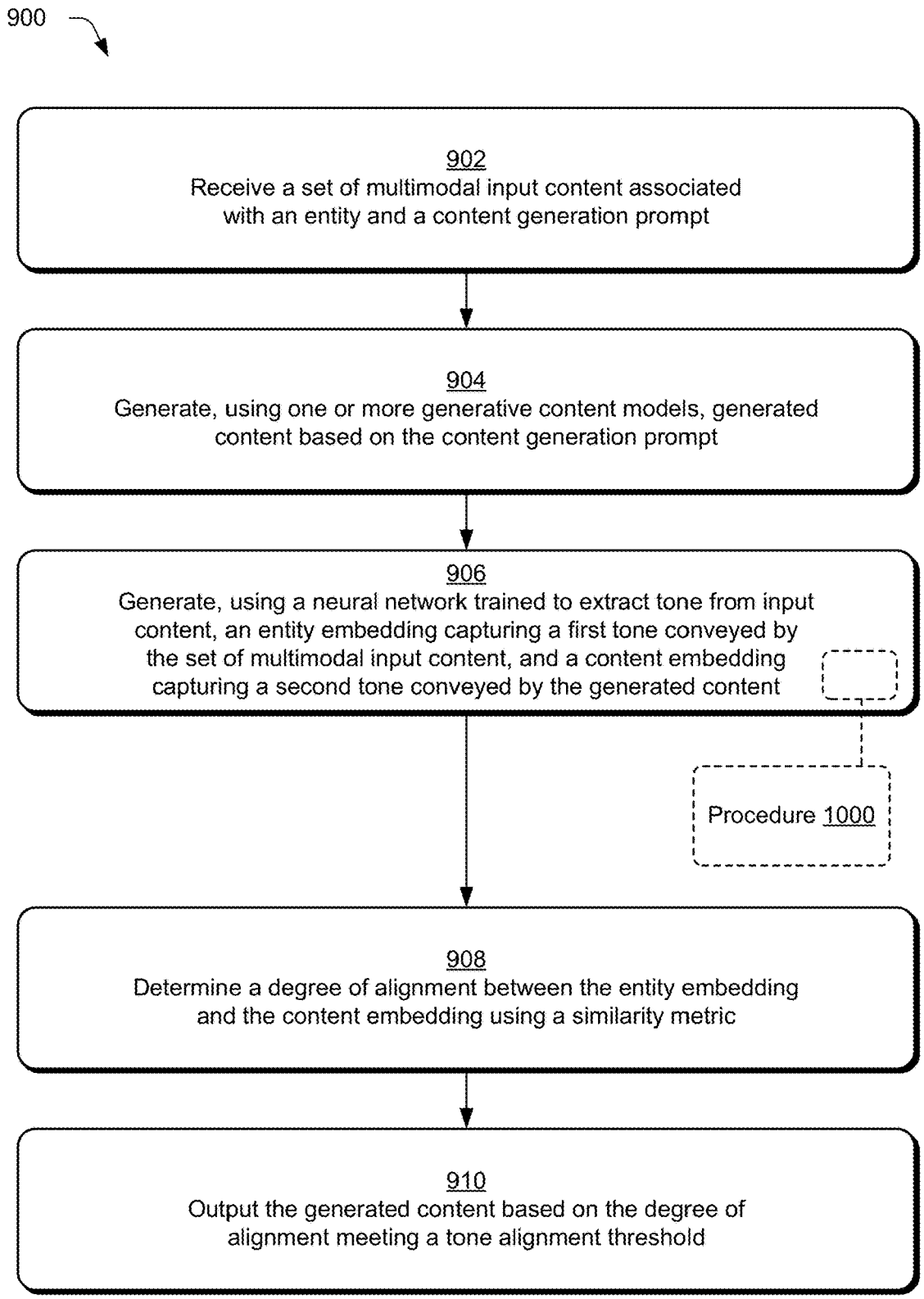
FIG. 9 is a flow diagram depicting a procedure in an example implementation for inferring tone conveyed by digital content.

FIG. 9 is a flow diagram depicting a procedure 900 in an example implementation for inferring tone conveyed by digital content. A set of multimodal input content associated with an entity and a content generation prompt are received (block 902). By way of example, the tone embedding system 112 receives the multimodal input content 116 associated with the entity 206a, as well as the content generation prompt 202.

Generated content is generated using one or more generative content models based on the content generation prompt (block 904). By way of example, the tone embedding system 112 conditions the generative content models 204 on the content generation prompt 202, and the generative content models 204 produce generated content 114. In one or more implementations, the generative content models 204 leveraged for the content generation task correspond to a particular set of generative content models 204 having been refined based on the user interaction data 304 of consumers accessing content via a particular publication channel 208a of the entity 206a where the generated content 114 is to be published.

An entity embedding and a content embedding are generated using a neural network trained to extract tone from input content, the entity embedding capturing a first tone conveyed by the set of multimodal input content, and the content embedding capturing a second tone conveyed by the generated content (block 906). By way of example, the tone embedding neural network 120 receives the generated content, and generates a content embedding 122 that captures a tone conveyed by the generated content 114. In addition, the tone embedding neural network 120 receives the multimodal input content 116, and generates an entity embedding 124 that captures a tone conveyed, collectively, by the multimodal input content 116. As shown, the block 906 includes a procedure 1000 for training the tone embedding neural network 120, and extracting the entity embeddings 124 for the plurality of entities 206.

Figure 10:
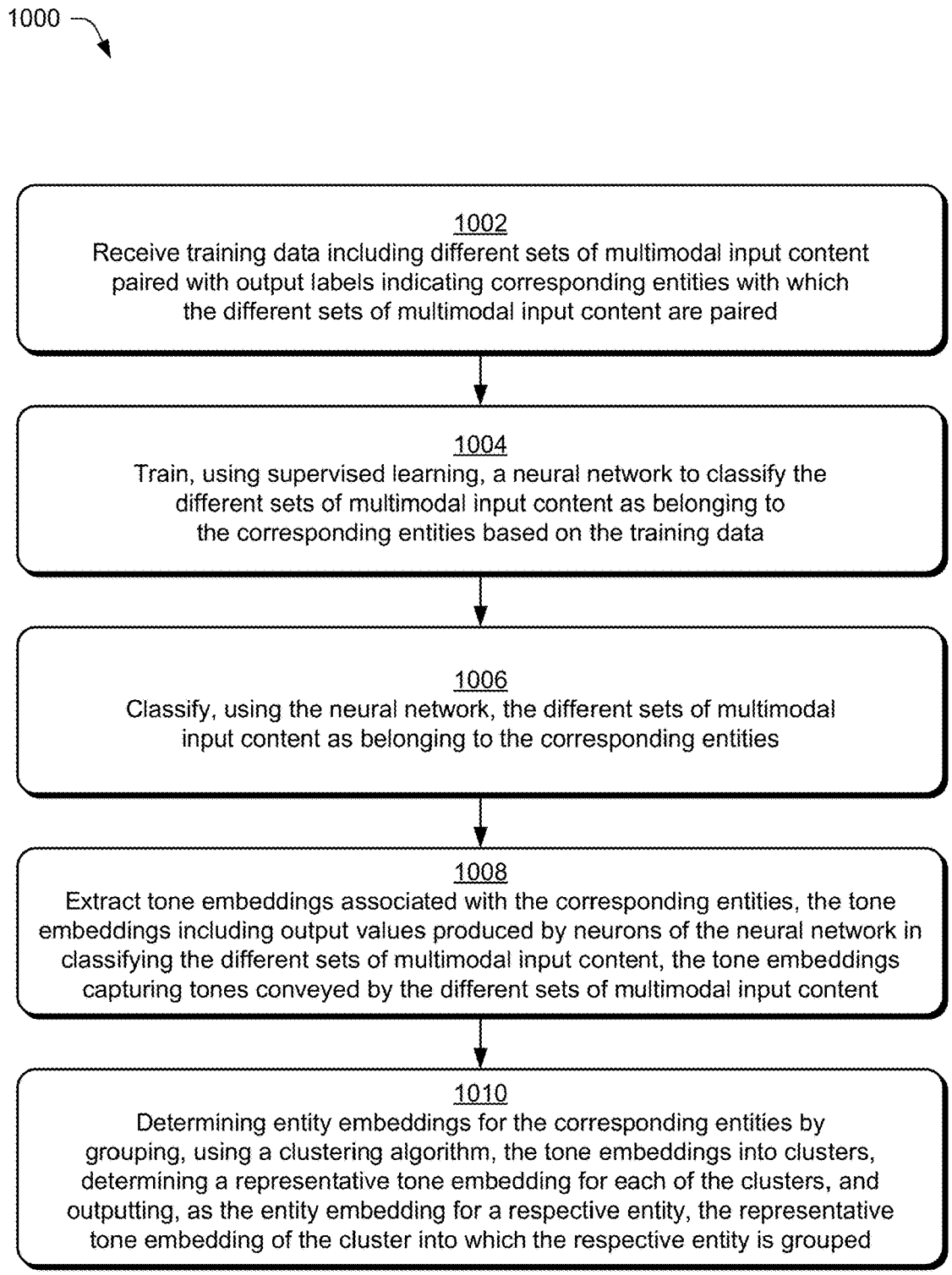
FIG. 10 is a flow diagram depicting a procedure in an example implementation for inferring tone conveyed by digital content.

FIG. 10 is a flow diagram depicting a procedure 1000 in an example implementation for inferring tone conveyed by digital content. Training data is received including different sets of multimodal input content paired with output labels indicating corresponding entities with which the different sets of multimodal input content are paired (block 1002). For example, the tone embedding neural network 120 receives the training data 402, including a plurality of training pairs 404. Each training pair 404 includes a set of multimodal input content 116 associated with an entity 206, and an output label 406 indicating the associated entity 206.

A neural network is trained using supervised learning to classify the different sets of the multimodal input content as belonging to the corresponding entities based on the training data (block 1004). By way of example, the tone embedding neural network 120 receives the training pairs 404, and classifies the multimodal input content 116 of the training pairs 404 as belonging to respective predicted entities 408. Using a supervised learning approach, a training module 410 updates parameters (e.g., activation weights of neurons) of the tone embedding neural network 120. The updates are based on differences (e.g., loss values) between the ground truth entities 206 indicated by the output labels 406 and the predicted entities 408 that are predicted based on the multimodal input content 116 paired with the ground truth entities 206.

The different sets of multimodal input content are classified, using the neural network, as belonging, to the corresponding entities (block 1006). Once trained, the tone embedding system 112 employs the tone embedding neural network to classify the different sets of multimodal input content 116 as belonging to one of the corresponding entities 206.

Tone embeddings associated with the corresponding entities are extracted, the tone embeddings including output values produced by neurons of the neural network in classifying the different sets of multimodal input content, and the tone embeddings capturing tones conveyed by the different sets of multimodal input content (block 1008). By way of example, the tone embedding neural network 120 extracts, as the tone embedding 502 of a respective entity 206, the output values 504 produced by the tone embedding neural network 120 in classifying the multimodal input content 116 paired with the respective entity 206. Tone embeddings 502 are similarly extracted for each of the entities 206 in the collection of entities 206.

Entity embeddings are determined for the corresponding entities by grouping, using a clustering algorithm, the tone embeddings into clusters, determining a representative tone embedding for each of the clusters, and outputting, as the entity embedding for a respective entity, the representative tone embedding of the cluster into which the respective entity is grouped (block 1010). By way of example, the tone embeddings 502 are provided, as input, to the clustering algorithm 506, which groups the tone embeddings 502 into clusters based on degree of similarity between the tone embeddings 502 in the tone embedding space. Further, the tone embedding system 112 determines, as the entity embedding 124 for each respective cluster 508, an average of the tone embeddings 502 within the respective cluster 508, e.g., a centroid tone embedding.

Returning to FIG. 9, a degree of alignment is determined between the entity embedding and the content embedding using a similarity metric (block 908). By way of example, the tone alignment determination module 126 determines a degree of alignment 128 between the entity embedding 124 of the entity 206a and the content embedding 122 using a similarity metric, e.g., cosine similarity.

The generated content is output based on the degree of alignment meeting a tone alignment threshold (block 910). Indeed, if the degree of alignment 128 meets the tone alignment threshold 130, the generated content 114 is output, e.g., for display in the user interface 800. If, however, the degree of alignment 128 does not meet the tone alignment threshold 130, the prompt update module 210 generates an updated content generation prompt 212, instructing the generative content models 204 to generate different generated content 114 based on the updated content generation prompt 212.

Example System and Device

Figure 11:
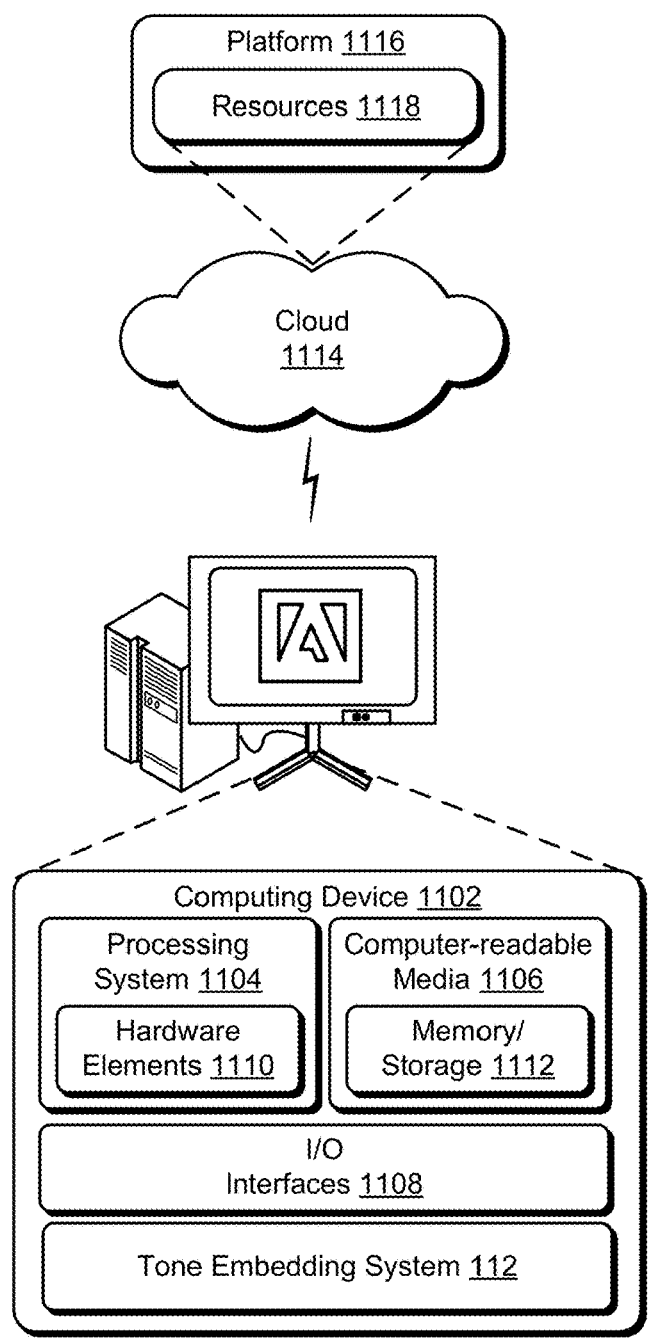
FIG. 11 illustrates an example system including various components of an example device that can be implemented as any type of computing device as described and/or utilized with reference to FIGS. 1-10 to implement embodiments of the techniques described herein.

FIG. 11 illustrates an example system generally at 1100 that includes an example computing device 1102 that is representative of one or more computing systems and/or devices that implement the various techniques described herein. This is illustrated through inclusion of the tone embedding system 112. The computing device 1102 is configurable, for example, as a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that is configurable as processors, functional blocks, and so forth. This includes implementation in hardware as an application specific integrated circuit or other logic device formed using one or more semiconductors. The hardware elements 1110 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1106 is illustrated as including memory/storage 1112. The memory/storage 1112 represents memory/storage capacity associated with one or more computer-readable media. The memory/storage 1112 includes volatile media (such as random access memory (RAM)) and/or nonvolatile media (such as read only memory (ROM), Flash memory, optical disks, magnetic disks, and so forth). The memory/storage 1112 includes fixed media (e.g., RAM, ROM, a fixed hard drive, and so on) as well as removable media (e.g., Flash memory, a removable hard drive, an optical disc, and so forth). The computer-readable media 1106 is configurable in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1102. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1102, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employed to implement various techniques described herein. Accordingly, software, hardware, or executable modules are implemented as one or more instructions and/or logic embodied on some form of computer-readable storage media and/or by one or more hardware elements 1110. The computing device 1102 is configured to implement particular instructions and/or functions corresponding to the software and/or hardware modules. Accordingly, implementation of a module that is executable by the computing device 1102 as software is achieved at least partially in hardware, e.g., through use of computer-readable storage media and/or hardware elements 1110 of the processing system 1104. The instructions and/or functions are executable/operable by one or more articles of manufacture (for example, one or more computing devices 1102 and/or processing systems 1104) to implement techniques, modules, and examples described herein.

The techniques described herein are supported by various configurations of the computing device 1102 and are not limited to the specific examples of the techniques described herein. This functionality is also implementable all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 abstracts resources and functions to connect the computing device 1102 with other computing devices. The platform 1116 also serves to abstract scaling of resources to provide a corresponding level of scale to encountered demand for the resources 1118 that are implemented via the platform 1116. Accordingly, in an interconnected device embodiment, implementation of functionality described herein is distributable throughout the system 1100. For example, the functionality is implementable in part on the computing device 1102 as well as via the platform 1116 that abstracts the functionality of the cloud 1114.

What is claimed is:

1. A method, comprising:
    receiving, by a processing device, a set of multimodal input content associated with an entity, and a content generation prompt;
    generating, by the processing device and using one or more generative content models, generated content based on the content generation prompt;
    generating, by the processing device and using a neural network trained to extract tone from input content, an entity embedding capturing a first tone conveyed by the set of multimodal input content, and a content embedding capturing a second tone conveyed by the generated content;
    determining, by the processing device, a degree of alignment between the entity embedding and the content embedding using a similarity metric; and
    outputting, by the processing device, the generated content based on the degree of alignment meeting a tone alignment threshold.

2. The method of claim 1, wherein the set of multimodal input content includes one or more of image content, video content, textual content, and audio content received from one or more online publication channels associated with the entity where the multimodal input content is published.

3. The method of claim 1, wherein the generated content includes one or more of image content, video content, textual content, and audio content.

4. The method of claim 1, further comprising:
    receiving, by the processing device, training data including different sets of multimodal input content paired with corresponding entities, the training data further including output labels indicating the corresponding entities with which the different sets of multimodal input content are paired; and
    training, by the processing device and using supervised learning, the neural network to classify the different sets of multimodal input content as belonging to the corresponding entities based on the training data, the corresponding entities including the entity.

5. The method of claim 4, wherein the generating the content embedding includes classifying, using the neural network, the generated content as belonging to one of the corresponding entities, the content embedding including output values produced by neurons of the neural network in classifying the generated content.

6. The method of claim 4, wherein the generating the entity embedding includes:
    classifying, using the neural network, the different sets of multimodal input content as belonging to the corresponding entities; and
    extracting tone embeddings associated with the corresponding entities, the tone embeddings including output values produced by neurons of the neural network in classifying the different sets of multimodal input content.

7. The method of claim 6, wherein the generating the entity embedding includes:
    grouping, using a clustering algorithm, the tone embeddings into clusters;
    determining a representative tone embedding for each of the clusters; and
    outputting, as the entity embedding, the representative tone embedding of a cluster into which a tone embedding of the entity is grouped.

8. The method of claim 1, further comprising:
receiving, by the processing device, different tone alignment thresholds for different online publication channels associated with the entity; and
receiving user input specifying a particular online publication channel via which the generated content is to be published, the tone alignment threshold corresponding to the particular online publication channel.

9. The method of claim 8, wherein the receiving the tone alignment threshold corresponding to the particular online publication channel includes:
collecting user interaction data describing rates at which one or more objectives are converted by users accessing content publications that have been published via the particular online publication channel;
determining, using the neural network, degrees of alignment between the content publications and the first tone conveyed by the set of multimodal input content associated with the entity; and
learning, using reinforcement learning, the tone alignment threshold of the particular online publication channel of the entity by comparing the rates and the degrees of alignment.

10. The method of claim 1, further comprising:
generating, by the processing device, an updated content generation prompt based on the degree of alignment being below the tone alignment threshold; and
generating, by the processing device and using the one or more generative content models, different generated content based on the updated content generation prompt.

11. The method of claim 10, wherein the generating the updated content generation prompt includes extracting, using a machine learning model trained to extract attributes associated with embeddings generated using the neural network, one or more attributes associated with the entity based on the entity embedding, the updated content generation prompt including the one or more attributes.

12. The method of claim 11, further comprising:
receiving, by the processing device, pairs of training data, each respective pair including a training embedding generated using the neural network, and an output label including a curated list of attributes associated with the training embedding; and
training, by the processing device and using supervised learning, the machine learning model to predict attributes associated with the embeddings generated using the neural network based on the training data.

13. The method of claim 1, wherein the entity publishes content via a plurality of online publication channels, each respective online publication channel of the entity including a set of one or more generative content models trained to generate content, which when published via the respective online publication channel, influences one or more objectives of the entity, and the generating the generated content includes leveraging the one or more generative content models of a particular online publication channel via which the generated content is to be published.

14. The method of claim 13, further comprising:
collecting user interaction data describing rates at which the one or more objectives are converted by users accessing published generated content that has been published via the particular online publication channel; and
training, using reinforcement learning, the one or more generative content models of the particular online publication channel to generate the content, which when published via the particular online publication channel, influences the one or more objectives based on the rates associated with the published generated content.

15. A system, comprising:
a processing device; and
a computer-readable medium storing instructions that, responsive to execution by the processing device, cause the processing device to perform operations including:
receiving training data including different sets of multimodal input content paired with output labels indicating corresponding entities with which the different sets of multimodal input content are paired;
training, using supervised learning, a neural network to classify the different sets of multimodal input content as belonging to the corresponding entities based on the training data;
classifying, using the neural network, the different sets of multimodal input content as belonging to the corresponding entities; and
extracting tone embeddings associated with the corresponding entities, the tone embeddings including output values produced by neurons of the neural network in classifying the different sets of multimodal input content, the tone embeddings capturing tones conveyed by the different sets of multimodal input content.

16. The system of claim 15, the operations further comprising:
receiving content to be published via an on online publication channel of a particular entity of the corresponding entities;
classifying, using the neural network, the content as belonging to one of the corresponding entities; and
extracting a content embedding including the output values produced by the neurons of the neural network in classifying the content.

17. The system of claim 16, the operations further comprising:
determining a degree of alignment between the content embedding and a tone embedding of the particular entity; and
outputting the content based on the degree of alignment meeting a tone alignment threshold.

18. The system of claim 16, wherein the receiving the content includes receiving a content generation prompt, and generating the content using one or more generative content models based on the content generation prompt.

19. A non-transitory computer-readable medium storing executable instructions, which when executed by a processing device, cause the processing device to perform operations, comprising:
receiving a content generation prompt and an indication of an online publication channel of an entity via which generated content is to be published;
generating, using one or more generative content models, the generated content based on the content generation prompt, the one or more generative content models trained to generate content, which when published via the online publication channel, influences one or more objectives of the entity;
generating, using a neural network trained to extract tone from input content, a content embedding capturing a first tone conveyed by the generated content; and
outputting the generated content based on a degree of alignment between the content embedding and an entity embedding that captures a second tone associated with the entity, the generated content being output based on the degree of alignment meeting a tone alignment threshold.

20. The non-transitory computer-readable medium of claim 19, the operations further comprising:
generating, by the processing device, an updated content generation prompt based on the degree of alignment being below the tone alignment threshold; and
generating, by the processing device and using the one or more generative content models, different generated content based on the updated content generation prompt.

* * * * *